United States Patent [19]

Tracy et al.

[11] Patent Number: 5,443,225
[45] Date of Patent: Aug. 22, 1995

[54] METHOD AND APPARATUS FOR PULLING A VEHICLE

[76] Inventors: John J. Tracy, 17 Staples Pl.; Robert A. Tracy, 23 Waterside La., both of West Hartford, Conn. 06107

[21] Appl. No.: 115,238

[22] Filed: Sep. 2, 1993

[51] Int. Cl.⁶ .................... B65H 75/42; B60C 27/06
[52] U.S. Cl. .................................. 242/392; 238/14
[58] Field of Search ............... 242/391, 392; 254/323, 254/328; 238/14; 180/7.5, 9; 152/208, 213 R, 213 A

[56] References Cited

U.S. PATENT DOCUMENTS

| | | | |
|---|---|---|---|
| 1,077,101 | 10/1913 | Smay, Jr. | |
| 1,096,606 | 5/1914 | Delano | |
| 1,165,442 | 12/1915 | Pillsbury | |
| 1,393,349 | 10/1921 | Davis | |
| 1,502,123 | 7/1924 | Sall | |
| 1,617,271 | 2/1927 | Penfield | 238/14 |
| 1,718,509 | 6/1929 | West | 238/14 |
| 2,496,119 | 1/1950 | Cesen | |
| 2,744,690 | 5/1956 | McClain | 242/392 X |
| 3,630,440 | 12/1971 | Sams | 238/14 |
| 3,797,549 | 3/1974 | Lieberum | 238/14 |
| 4,135,681 | 1/1979 | Cooper | |
| 4,211,366 | 7/1980 | Czarnota | |

*Primary Examiner*—John M. Jillions
*Attorney, Agent, or Firm*—Chilton, Alix & Van Kirk

[57] ABSTRACT

Method and apparatus for pulling a vehicle free from mud, etc. using a vehicle drive wheel as a windless or winch and employing an elongated flexible strap, a gripper plate mounted on a leading end of the strap and an anchor plate mounted on a trailing end of the strap. The gripper plate is inserted between the tire and its support surface with upstanding teeth of the gripper plate engaging the tire. The drive wheel is then rotated with the vehicle engine to draw the gripper plate around the tire and wrap the trailing strap around the tire. The gripper plate is then secured to the overlapping strap, the anchor plate is anchored at a remote point aligned with the drive wheel and the vehicle is driven towards the anchor point using the strap to pull the vehicle free.

10 Claims, 2 Drawing Sheets

METHOD AND APPARATUS FOR PULLING A VEHICLE

BRIEF BACKGROUND & SUMMARY OF THE INVENTION

The present invention relates generally to a method and apparatus which employs a vehicle drive wheel as a windless or winch for pulling a vehicle free from mud or snow or from a ditch, etc.

A principal aim of the present invention is to provide a new and improved method of the type described having a simple mode of operation and employing apparatus which may be readily wrapped around and removed from the tire of the vehicle drive wheel.

Another aim of the present invention is to provide a new and improved apparatus of the type described which can be compactly stored for use when needed, which is lightweight and durable and which can be repeatedly used.

Another aim of the present invention is to provide a new and improved apparatus of the type described which can be mass produced at low cost.

Other objects will be in part obvious and in part pointed out more in detail hereinafter.

A better understanding of the invention will be obtained from the following detailed description and the accompanying drawings of an illustrative application of the invention.

DESCRIPTION OF THE PREFERRED EMBODIMENT

Figure 1:
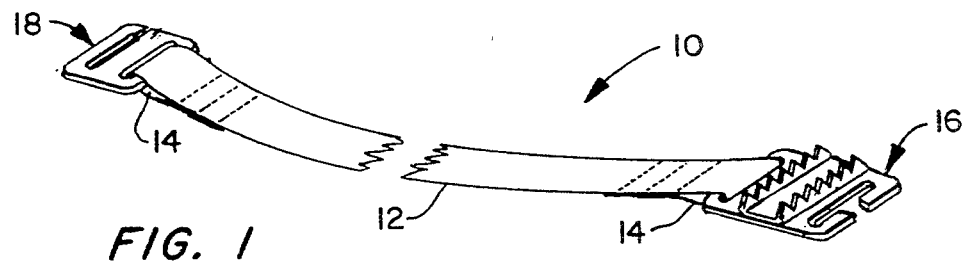
FIG. 1 is an isometric view, partly broken away, of an elongated strap device, incorporating an embodiment of the present invention, adapted to be used with a vehicle drive wheel to pull a vehicle free from mud or snow, etc.
Figure 2:
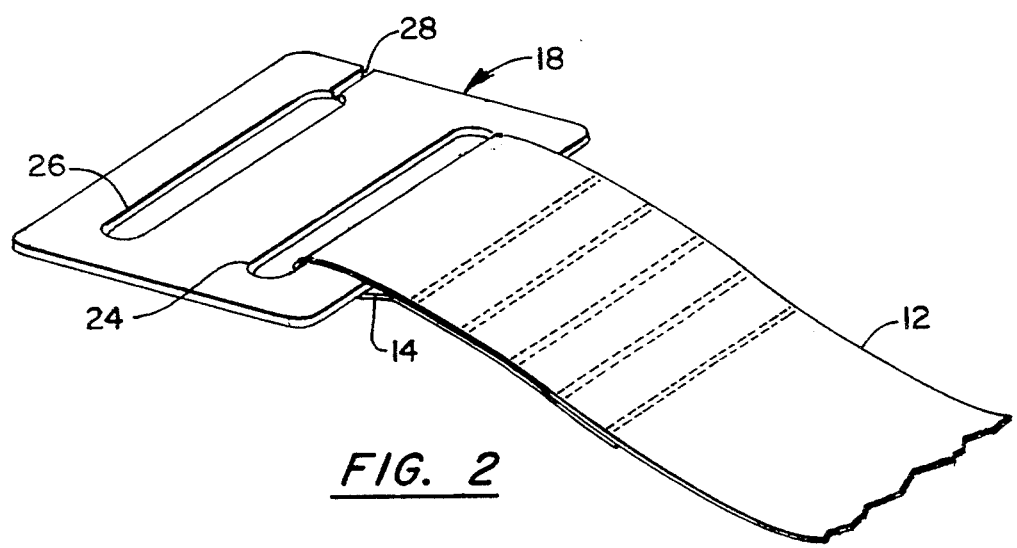
FIG. 2 is an enlarged isometric view, partly broken away, of one end of the elongated strap device, showing an anchor plate of the device.
Figure 3:
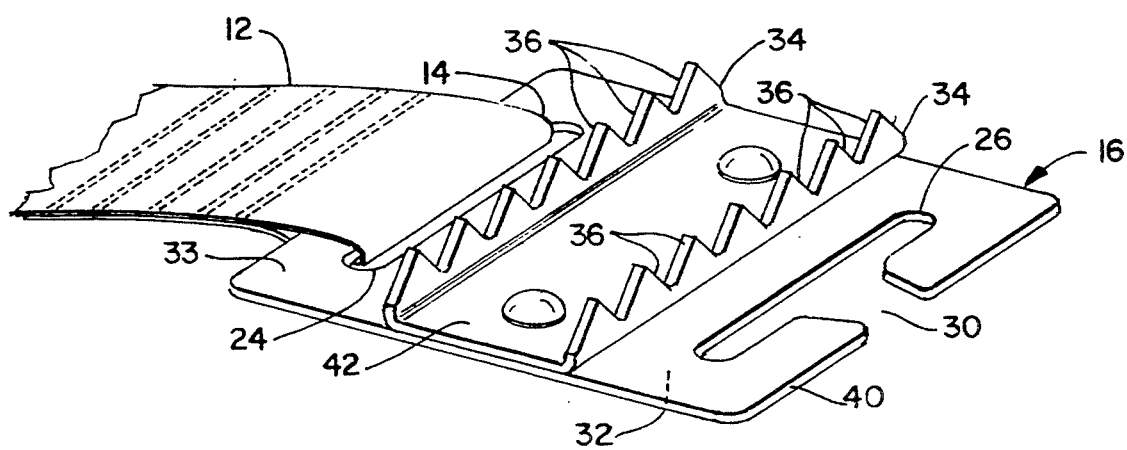
FIG. 3 is an enlarged isometric view, partly broken away, of the other end of the elongated strap device, showing a gripper plate of the device.
Figure 4:
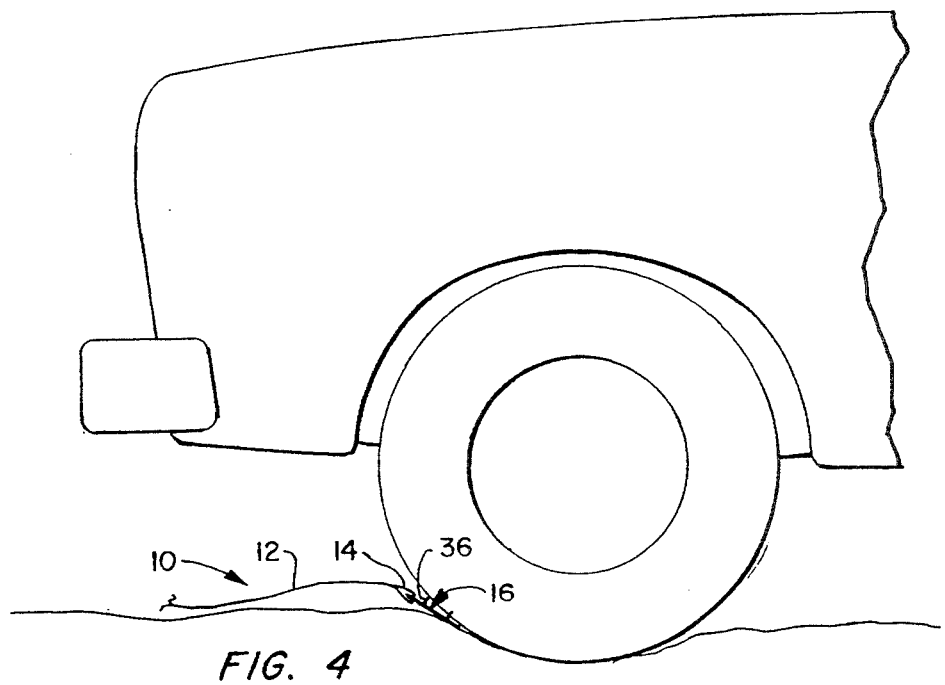
FIG. 4 is a reduced, generally diagrammatic, side elevation view, partly broken away, showing the gripper plate inserted under a front drive wheel of an automobile.
Figure 5A:
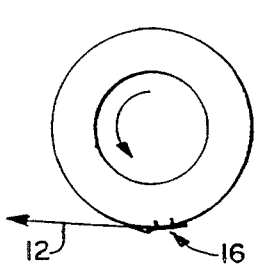
FIGS. 5A, 5B and 5C are reduced generally diagrammatic, side elevation views, showing how the elongated strap device is installed on a vehicle drive wheel.
Figure 5B:
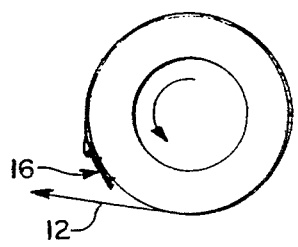
Figure 5C:
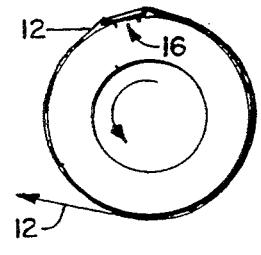
Figure 6:
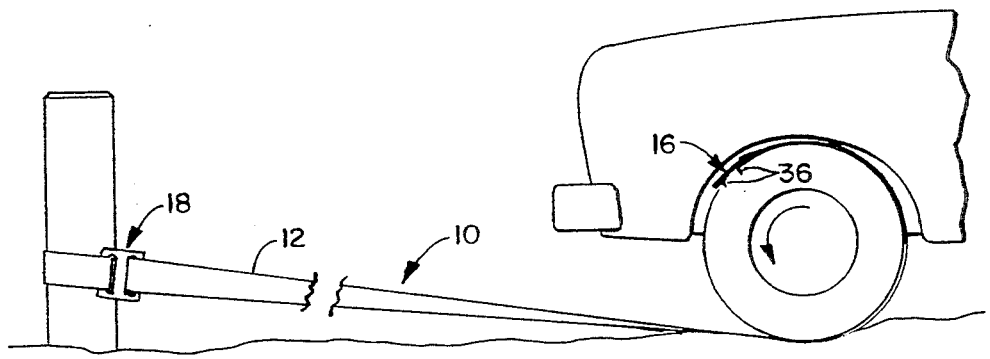
FIG. 6 is a generally diagrammatic, side elevation view, partly broken away, showing the anchor plate anchoring one end of the elongated strap device to a post and showing the automobile being driven toward the anchor point by wrapping the elongated strap device around a front drive wheel of the vehicle.

In the drawings, like numerals are employed to designate the same or similar parts. A device or apparatus 10 incorporating a preferred embodiment of the present invention is shown in the drawings. The device 10 may be used with both passenger cars and larger vehicles to pull the vehicle free from mud or snow or from a ditch, etc.

The pulling device 10 employs a heavy duty, flat strap 12 of synthetic material. For passenger cars having standard width tires, the strap 12 is preferably approximately 2 to 2½ inches wide and has a load rating of approximately 5,000 lb. A wider strap 12 having a higher load rating is preferably used with larger vehicles. Also, a wider strap 12 may be effectively used with passengers cars having extra wide tires. The strap material may be polypropoline, nylon or any other suitable synthetic material having the requisite strength and flexibility. Preferably, the strap material is woven and has a relatively rough surface on each face providing a relatively high coefficient of friction between the strap 12 and a vehicle tire and between adjacent wraps of strap 12 wrapped about a vehicle tire as hereafter described. The elongated strap 12 is preferably about 50 feet long but can be longer or shorter depending in part on the type of vehicle with which the pulling device 10 is used and the circumference of the vehicle tire. The strap 12 can be used in combination with a trailing length of rope, in which case the strap may be significantly less than 50 feet long and for example be only approximately 20–25 feet long.

An end plate is provided at each end of the strap 12. A gripper plate 16 is provided at a leading end of the strap 12 and an anchor plate 18 is provided at the opposite or trailing end of the strap 12. Each end plate 16, 18 is mounted on an end loop 14 of strap material to secure the end plate to the strap 12. Each end plate 16, 18 has a transverse mounting slot 24 at the inner end of the plate for threading a free end of the strap 12 through the plate. The free end of the strap 12 is then folded back and suitably sewn or otherwise secured to the strap 12 to secure the end plate to the strap 12.

Each end plate 16, 18 also has a transverse retaining slot 26 at the outer end of the plate. In the anchor plate 18, a relatively narrow lateral entrance opening 28 is provided at one edge of the anchor plate 18 for feeding the strap laterally into the retaining slot 26. The entrance opening 28 is narrower than the retaining slot 26 to help retain the strap 12 within the retaining slot 28. The anchor plate 18 facilitates securing the trailing end of the strap 12 to a post, tree or other anchoring structure such as a bumper or frame of a vehicle. The trailing end of the strap 12 is suitably wound around the anchoring structure and then the anchor plate 18 is hooked onto the strap 12 by manipulating the anchor plate 18 and/or the strap 12 to insert the strap 12 into the outer retaining slot 26 in the anchor plate 18. As an alternative, the anchor plate 18 is anchored directly to the ground by driving one or two long, steel, nail-like pins into the ground through the transverse slots 24, 26 in the anchor plate 18. As another alternative, a suitable rope can be connected between the trailing end loop 14 of the strap 12 and a more distant anchoring point.

The gripper plate 16 has a central, relatively wide entrance opening 30 at the outer end of the plate 16 to facilitate inserting the strap 12 into the outer retaining slot 26 in the gripper plate 16 after the leading end of the strap 12 is wrapped about a drive wheel tire as hereafter described.

The two end plates 16, 18 are formed from suitable gauge (e.g., 1/16 or ⅛ inch thick) sheet metal stock. Each plate has a generally rectangular shape with rounded corners to facilitate handling. The end plates 16, 18 are preferably approximately 1½ inches wider than the strap 12 and extend laterally, at least approximately ½ inch, beyond each slot 24, 26 at each end of the slot. The plates 16, 18 are preferably flat as shown. In the alternative, the gripper plate 16 may be curved slightly in the longitudinal direction to conform approximately to the outer curvature of a vehicle tire to facilitate using the pulling device 10 as hereafter described.

The gripper plate 16 has a completely smooth outer surface 32. The inner surface 33 of the gripper plate has two longitudinally spaced, laterally extending rows 34 of upstanding teeth 36. In the shown embodiment, the gripper plate 16 is composed of a base plate 40 (having the described slots 24, 26 and slot opening 30) and a second, generally U-shaped plate 42 having upstanding irregular edges forming the two rows 34 of upstanding teeth 36. The U-shaped plate is riveted to the inner surface of the base plate 40 between the slots 24, 26. In the alternative, the upstanding teeth 36 are formed directly from the base plate 40 (in which case, the second plate 42 is unnecessary and is not provided). In the shown embodiment, six identical and symmetrical teeth 36 are provided in each row 34. Each tooth 36 has a triangular shape with an upper apex forming a tooth edge. The upstanding teeth 36 are sized and shaped to grip the outer surface or tread of a tire, without damaging the tire, to pull the gripper plate 16 and trailing strap 12 around the tire as the vehicle wheel is rotated slowly by the vehicle engine. Gripper teeth 36 having a height of approximately ¼ inch are believed to be satisfactory for most tires. The tooth edges are made relatively dull (i.e., have an included angle of approximately 90° at their apex) to avoid cutting the tire.

The pulling device 10 is used by wrapping the strap 12 around a vehicle drive wheel tire in a manner which uses the drive wheel as a windlass or winch to pull the vehicle. First, a suitable anchoring point is selected for anchoring the trailing end of the strap 12 either directly or by means of a rope connected to the trailing end of the strap 12. As indicated, another vehicle can be used as an anchoring structure or the anchoring point can be established by directly anchoring the anchor plate 18 to the ground. The anchoring point should be located generally in alignment with the vehicle drive wheel to which the strap is to be attached (in front of or behind the vehicle, depending on which direction the vehicle is to be pulled by the pulling device 10). If the selected drive wheel is a front wheel, the wheel should be turned into alignment with the anchoring point. The strap is then wrapped around the tire of the selected drive wheel in the following manner. First, the gripper plate 16 is inserted between the tire and ground (or other wheel supporting surface) with the teeth 36 of the gripper plate 16 facing upwardly and the smooth outer surface 32 of the gripper plate 16 facing downwardly. The gripper plate should be centrally located between the sides of the tire and in alignment with the centerline plane of the tire. The gripper plate 16 is wedged between the tire and support surface in that manner with at least the front or leading row 34 of teeth 36 engaging the tire. The gripper plate 16 is wedged between the tire and support surface in front of the wheel if the vehicle is to be pulled forwardly and behind the wheel if the vehicle is to be pulled rearwardly. The trailing strap is then laid out flat in alignment with the selected wheel and in the direction of the intended anchoring point. Preferably at least 15 to 20 feet of strap is laid out in that manner. The drive wheel is then rotated slowly with the vehicle engine, preferably about one revolution, to draw the gripper plate and trailing strap completely or nearly completely around the tire (with the trailing strap centered on the tire). Then, if the gripper plate is accessible, the strap 12 is inserted into the outer slot 26 in the gripper plate 16 either by inserting the strap 12 in the slot 26 while the gripper plate 16 remains in engagement with the tire or by withdrawing and manipulating the gripper plate 16 to insert the strap into the outer slot 26. The trailing strap is then tensioned slightly so that the strap 12 and gripper plate 16 are tightly and securely wrapped about the central outer surface of the tire. If desired, the drive wheel is then rotated slowly with the vehicle engine to firmly secure the strap to the tire and provide a second partial or complete wrap about the tire. The trailing end of strap 12 is then anchored with the length of strap between the drive wheel and anchoring point laid out flat (not twisted) and reasonably taut. The vehicle is then driven slowly in the appropriate direction to wrap the strap 12 around the drive wheel tire and pull the vehicle toward the anchoring point. In that manner, the pulling device 10 assists in pulling the vehicle forwardly or rearwardly when the wheel traction, by itself, is insufficient to drive the vehicle. In so doing, the selected drive wheel serves as a windlass or winch for pulling the vehicle. Initially, the gripper plate 16 secures the leading end of the strap 12 to the tire to provide for tightening the strap 12 about the tire. The friction between the strap 12 and tire and between overlapping wraps of the strap 12 on the tire then prevent strap slippage around the tire. If the other drive wheel spins after a pulling device 10 is installed as described, a second pulling device 10 is mounted on the other drive wheel in the same manner. In that event, the two pulling devices 10 would cooperate to pull the vehicle free.

After the vehicle is pulled free, the trailing end of strap is released from its anchoring point to remove the tension in the strap 12. The wraps or loops of strap on the drive wheel tire (and the gripper plate 16 if it is not at the bottom of the tire) are then pulled off the top of the tire so that the vehicle can be driven free of the remaining part of the loops under the bottom of the tire. The strap 12 is then wound around the anchor plate 18 for compactly storing the device 10 for reuse when needed.

As will be apparent to persons skilled in the art, various modifications, adaptations and variations of the foregoing specific disclosure can be made without departing from the teachings of the present invention.

We claim:

1. Vehicle pulling apparatus comprising an elongated flexible strap, with a pair of opposed generally flat faces, adapted to be wrapped about a tire of a vehicle drive wheel with one face of the strap facing inwardly toward the tire, for pulling the vehicle with the drive wheel by using the drive wheel as a winch; an end plate mounted on one end of the strap for being wedged between the tire and the drive wheel support surface; gripping means on the end plate for gripping the tire and drawing the end plate and trailing strap around the tire to wrap a portion of the strap around the tire and over the end plate by rotation of the drive wheel in one direction with the vehicle engine; attachment means on the end plate for attaching the end plate to the strap wrapped over the end plate; and anchoring means on the strap longitudinally spaced from the end plate for anchoring the strap at a point aligned with and spaced from the vehicle drive wheel for pulling the vehicle toward the anchoring point with the strap by wrapping the strap further around the tire by further rotation of the drive wheel in said one direction with the vehicle engine.

2. Vehicle pulling apparatus according to claim 1 wherein the end plate has an outer side with a smooth surface engageable with the drive wheel support surface when the end plate is wedged between the tire and the support surface and an inner side engageable with the tire, the end plate having a transverse, strap receiving slot for receiving the strap for mounting the end plate on said one end of the strap, the gripping means comprising upstanding teeth on the inner side of the end plate for gripping the tire, when the end plate is wedged between the tire and the drive wheel support surface, for drawing the end plate and trailing strap around the tire and over the end plate by rotation of the drive wheel in said one direction with the vehicle engine.

3. Vehicle pulling apparatus according to claim 2 wherein the upstanding teeth comprise at least one transverse row of upstanding teeth.

4. Vehicle pulling apparatus according to claim 1 wherein the elongated flexible strap is a woven strap and each of the opposed generally flat faces has a relatively rough surface.

5. Vehicle pulling apparatus according to claim 1 wherein the end plate and anchoring means each comprises a connector plate with a first transverse strap receiving slot at one longitudinal end thereof for receiving the strap for mounting the connector plate thereon and wherein the attachment means comprises a second strap receiving slot at the other end of the respective connector plate and a slot opening for selectively inserting the strap therein.

6. Vehicle pulling apparatus according to claim 1 wherein the strap has a transverse width of at least approximately two inches. some of the fixed teeth in engagement with the tire for gripping the tire.

7. A method of using a vehicle drive wheel, of the type having an outer tire, as a winch for pulling a vehicle; comprising the steps of providing an elongated flexible strap with a pair of opposed generally flat faces; providing a strap insertion part on a leading end of the strap; inserting the insertion part between the tire and drive wheel support surface so that the insertion part is wedged therebetween; laying out an untwisted length of the strap trailing the insertion part in general alignment with the drive wheel; wrapping a leading portion of the strap around the outer surface of the tire and over the insertion part, with one face of the strap facing inwardly toward the tire; attaching the insertion part to the leading portion of strap wrapped thereover; the wrapping step being provided at least in part by rotating the drive wheel in one direction with the vehicle engine; anchoring the trailing length of strap at a point spaced from the drive wheel and in general alignment with the drive wheel; and wrapping the strap further around the outer surface of the tire, with the trailing length of strap anchored at the anchoring point, by rotating the drive wheel in said one direction with the vehicle engine, to pull the vehicle toward the anchoring point with the strap.

8. A method, according to claim 7, of using a vehicle drive wheel as a winch for pulling the vehicle, wherein the elongated flexible strap is a woven strap and each of the opposed generally flat faces of the strap has a relatively rough surface.

9. A method of using a vehicle drive wheel, of the type having an outer tire, as a winch for pulling a vehicle; comprising the steps of providing an elongated flexible strap with a pair of opposed generally flat faces; providing an end plate on the leading end of the strap having fixed teeth forming tire gripping means; inserting the end plate and tire gripping means between the tire and the drive wheel support surface so that the gripping means is wedged therebetween with at least some of the fixed teeth in engagement with the tire for gripping the tire; laying out an untwisted trailing length of the strap in general alignment with the drive wheel; wrapping a leading portion of the strap around the outer surface of the tire, with one face of the strap facing inwardly toward the tire; the wrapping step being provided, at least in part, by rotating the drive wheel in one direction with the vehicle engine; anchoring the trailing length of strap to an anchoring point spaced from the drive wheel and in general alignment with the drive wheel; and wrapping the strap further around the outer surface of the tire, with the trailing length of strap anchored at the anchoring point, by rotating the drive wheel in said one direction with the vehicle engine, to pull the vehicle toward the anchoring point with the strap.

10. A method of using a vehicle drive wheel, of the type having an outer tire, as a winch for pulling a vehicle; comprising the steps of providing an elongated flexible strap with a pair of opposed generally flat faces; providing tire gripping means on a leading end of the strap; inserting the tire gripping means between the tire and the drive wheel support surface so that the gripping means is wedged therebetween with the gripping means gripping the tire; laying out an untwisted trailing length of the strap in general alignment with the drive wheel; wrapping a leading portion of the strap around the outer surface of the tire, with one face of the strap facing inwardly toward the tire; the wrapping step comprising the step of drawing, with the gripping means, the leading end of the strap around the drive wheel and over the leading end of the strap and then attaching the leading end of the strap to the leading portion of strap wrapped thereover; the wrapping step being provided, at least in part, by rotating the drive wheel in one direction with the vehicle engine; anchoring the trailing length of strap to an anchoring point spaced from the drive wheel and in general alignment with the drive wheel; and wrapping the strap further around the outer surface of the tire, with the trailing length of strap anchored at the anchoring point, by rotating the drive wheel in said one direction with the vehicle engine, to pull the vehicle toward the anchoring point with the strap.

* * * * *